United States Patent
Vadlamani et al.

(10) Patent No.: US 9,177,057 B2
(45) Date of Patent: Nov. 3, 2015

(54) RE-RANKING SEARCH RESULTS BASED ON LEXICAL AND ONTOLOGICAL CONCEPTS

(75) Inventors: Viswanath Vadlamani, Redmond, WA (US); Munirathnam Srikanth, Redmond, WA (US); Abhinai Srivastava, Seattle, WA (US); Tarek Najm, Kirkland, WA (US); Arungunram Chandrasekaran Surendran, Sammamish, WA (US); John Midgley, Seattle, WA (US); Mahbubul Alam Ali, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 72 days.

(21) Appl. No.: 12/796,127

(22) Filed: Jun. 8, 2010

(65) Prior Publication Data

US 2011/0302156 A1 Dec. 8, 2011

(51) Int. Cl.
G06F 17/30 (2006.01)
(52) U.S. Cl.
CPC .................. G06F 17/30864 (2013.01)
(58) Field of Classification Search
CPC .................. G06F 17/30864; G06F 17/30873; G06F 17/30876; G06F 17/3089; G06F 17/30899; G06F 17/30908
USPC ........ 707/723, 7231/1, 3, 771, 749, 736, 708, 707/4, 5, 652, 613
See application file for complete search history.

(56) References Cited

U.S. PATENT DOCUMENTS

| | | | | |
|---|---|---|---|---|
| 5,768,580 A * | 6/1998 | Wical | ................ | 1/1 |
| 5,887,120 A * | 3/1999 | Wical | ................ | 706/46 |
| 5,963,940 A * | 10/1999 | Liddy et al. | ................ | 1/1 |
| 6,061,692 A * | 5/2000 | Thomas et al. | ................ | 707/613 |
| 6,725,259 B1 | 4/2004 | Bharat | | |
| 7,003,513 B2 | 2/2006 | Geiselhart | | |
| 7,536,413 B1 * | 5/2009 | Mohan et al. | ................ | 1/1 |
| 7,827,147 B1 * | 11/2010 | D'Hoye et al. | ................ | 707/652 |

(Continued)

FOREIGN PATENT DOCUMENTS

CN 1829989 A 9/2006

OTHER PUBLICATIONS

Zhuang et al., "Re-Ranking Search Results Using Query Logs", 2006, ACM.*

(Continued)

*Primary Examiner* — Mariela Reyes
*Assistant Examiner* — Thong Vu
(74) *Attorney, Agent, or Firm* — Jessica Meyers; Jim Ross; Micky Minhas

(57) ABSTRACT

Search result re-ranking is provided by employing a concept graph from a metabase. When a search query is received, a query context of the search query is analyzed to identify dominant concepts for the search query. The dominant concepts are expanded by identifying the dominant concepts within a concept graph and identifying additional concepts having a strong relationship with the dominant concepts within the concept graph. A set of search results for the search query is analyzed to determine strength of relationship of each search result to the expanded concepts. The search results are re-ranked based on the strength of relationship of each search result to the expanded concepts and the strength of relationship of each expanded concept to the dominant concepts.

20 Claims, 4 Drawing Sheets

(56) References Cited

U.S. PATENT DOCUMENTS

| | | | | |
|---|---|---|---|---|
| 7,860,855 | B2* | 12/2010 | Hussami | 707/708 |
| 7,925,610 | B2* | 4/2011 | Elbaz et al. | 706/55 |
| 8,019,749 | B2* | 9/2011 | Leban | 707/713 |
| 8,122,016 | B1* | 2/2012 | Lamba et al. | 707/723 |
| 8,239,216 | B2* | 8/2012 | McCallie et al. | 705/2 |
| 8,315,849 | B1* | 11/2012 | Gattani et al. | 704/2 |
| 8,332,426 | B2* | 12/2012 | Ahn et al. | 707/771 |
| 8,463,810 | B1* | 6/2013 | Rennison | 707/771 |
| 8,666,993 | B2* | 3/2014 | Chunilal | 707/749 |
| 2004/0024756 | A1 | 2/2004 | Rickard | |
| 2006/0047649 | A1* | 3/2006 | Liang | 707/4 |
| 2006/0074910 | A1 | 4/2006 | Yun | |
| 2006/0206476 | A1 | 9/2006 | Kapur | |
| 2006/0253431 | A1* | 11/2006 | Bobick et al. | 707/3 |
| 2006/0271524 | A1* | 11/2006 | Tanne et al. | 707/3 |
| 2007/0214131 | A1 | 9/2007 | Cucerzan | |
| 2008/0154877 | A1* | 6/2008 | Joshi et al. | 707/5 |
| 2009/0112830 | A1* | 4/2009 | Denoue et al. | 707/4 |
| 2009/0112910 | A1* | 4/2009 | Picault et al. | 707/102 |
| 2010/0049684 | A1* | 2/2010 | Adriaansen et al. | 706/46 |
| 2012/0143880 | A1* | 6/2012 | Sweeney et al. | 707/749 |
| 2012/0278321 | A1* | 11/2012 | Traub et al. | 707/736 |

OTHER PUBLICATIONS

Kennedy, Lyndon, S. et al., A Reranking Approach for Context based Concept Fusion in Video Indexing and Retrieval—Published Date: Jul. 9, 2007 http://citeseerx.ist.psu.edu/viewdoc/download?doi=10.1.1.115.4571&rep=rep1&type=pdf.

Natsev, Apastol, et al., Semantic Concept-Based Query Expansion and Re-ranking for Multimedia Retrieval—Published Date: Sep. 23, 2007 http://citeseerx.ist.psu.edu/viewdoc/download?doi=10.1.1.153.5116&rep=rep1&type=pdf.

Pretschner, Alexander, et al., Ontology Based Personalized Search—Published Date: Nov. 1999 http://citeseerx.ist.psu.edu/viewdoc/download?doi=10.1.1.83.4585&rep=rep1&type=pdf.

The Knowledge Graph—See it in Action, Google Inside Search, Last Accessed Aug. 11, 2014, 2 pages. http://www.google.com/insidesearch/features/search/knowledge.html.

More Information About Websites to Help You Find the Right Result, Google Inside Search, Last Accessed Aug. 11, 2014, 2 pages. http://insidesearch.blogspot.com/2014/01/more-information-about-websites-to-help.html.

Your Answer, Loud and Clear, Google Inside Search, Last Accessed Aug. 11, 2014, 3 pages. http://www.google.com/insidesearch/.

Water Images, Google Search Results, Last Accessed Aug. 11, 2014, 10 pages. https://www.google.com/search?q=water&es_sm=93&source=lnms&tbm=isch&sa=X&ei=vZV_U52oM46Qqgaq44CoAQ&ved=0CAYQ_AUoAQ&biw=1746&bih=905.

Water, Google Search Results, Last Accessed Aug, 11, 2014, 2 pages. https://www.google.com/search?q=water&es_sm=93&source=lnms&sa=X&ei=b6p_U9yhOpSKqAal0YCIAQ&ved=0CAcQ_AUoAA&biw=1746&bih=905&dpr=1.1.

Things to Do in Paris, Google Search Results, Last Accessed Aug. 11, 2014, 2 pages. https://www.google.com/search?q=things+to+do+in+paris&oq=things+to+do+in+paris&aqs=chrome..69i57.5446j0j4&sourceid=chrome&es_sm=93&ie=UTF-8.

"First Office Action Issued in Chinese Patent Application No. 201110165186.2", Mailed Date: Jun. 1, 2015, 21 pages.

* cited by examiner

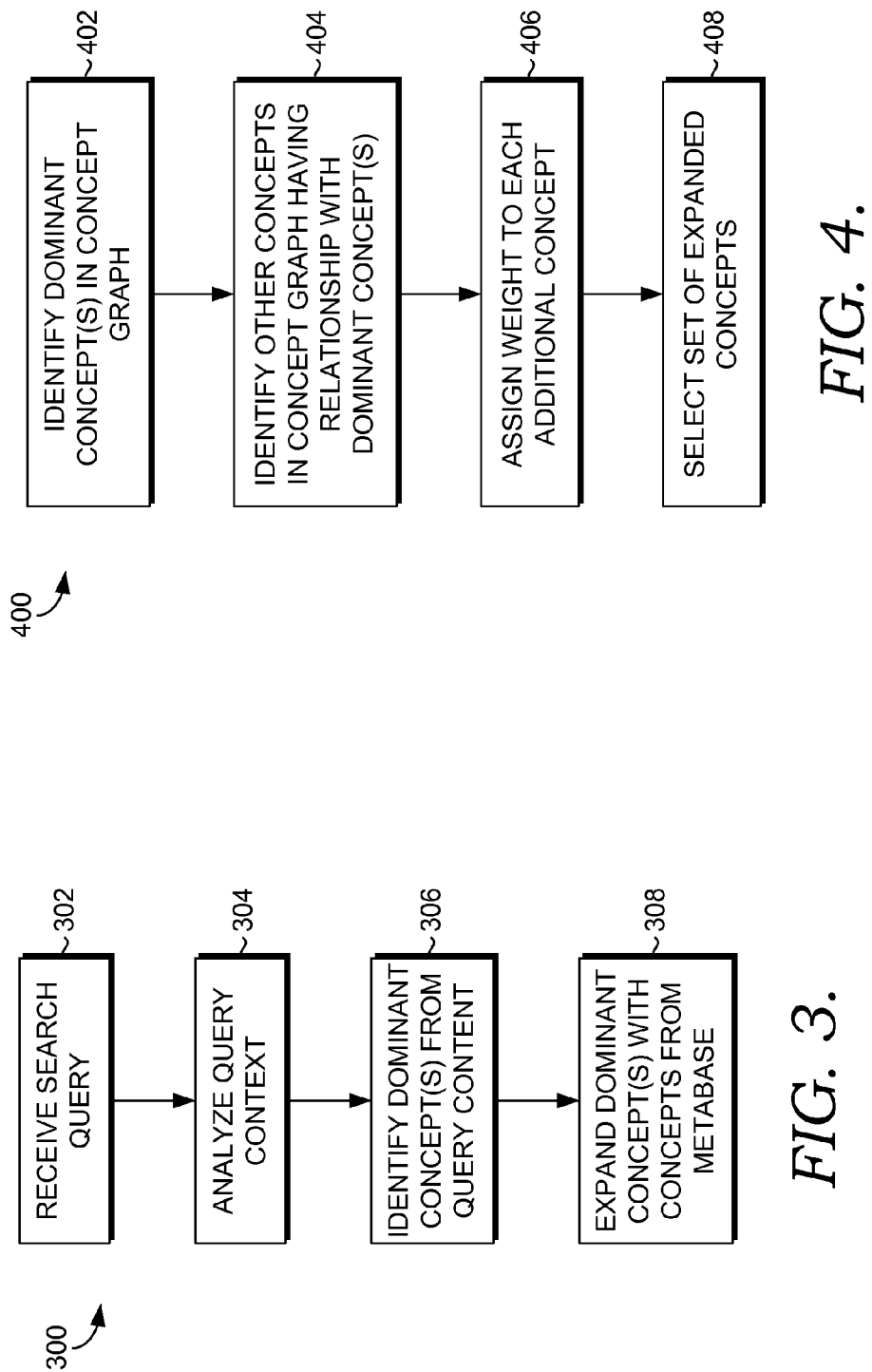

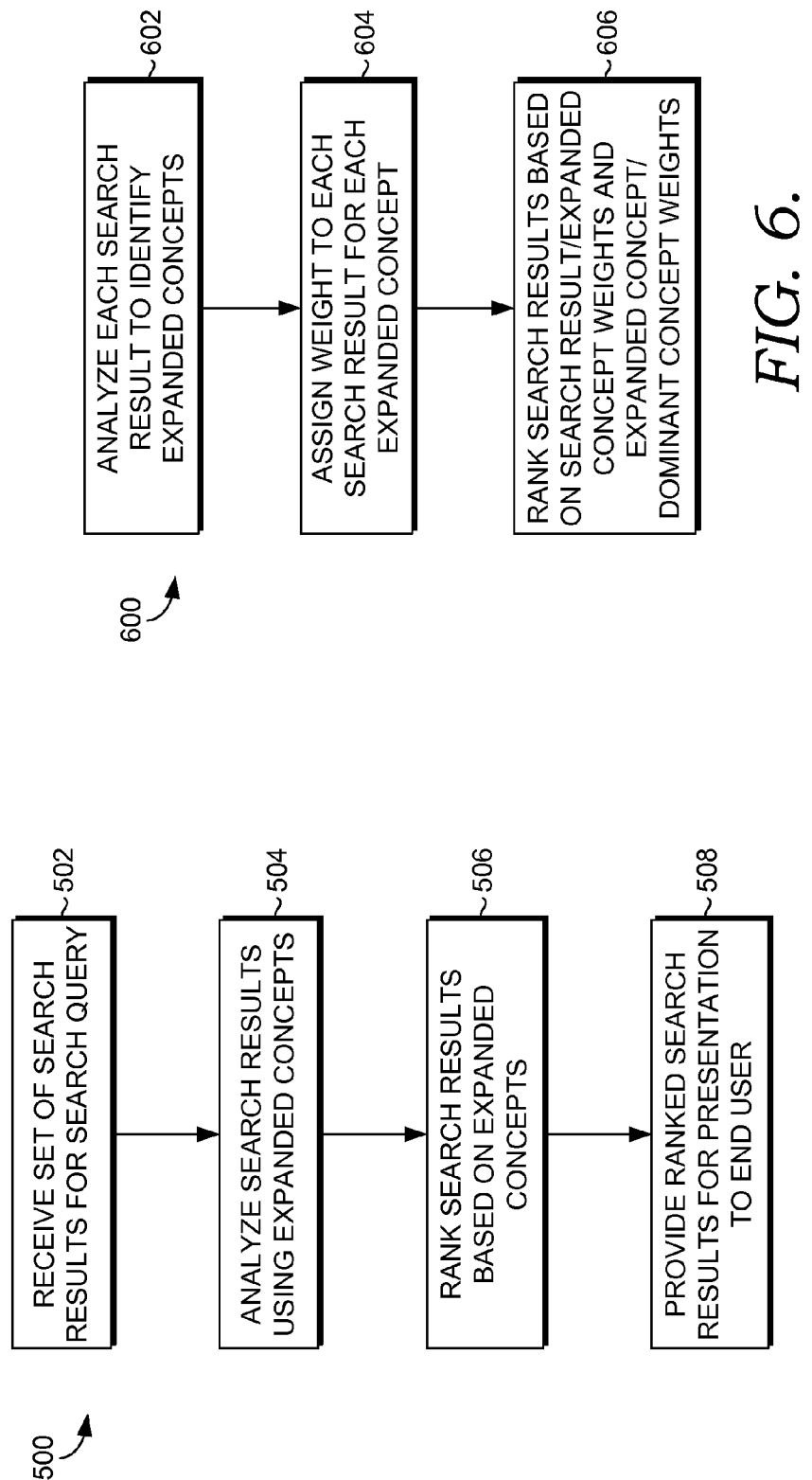

RE-RANKING SEARCH RESULTS BASED ON LEXICAL AND ONTOLOGICAL CONCEPTS

BACKGROUND

Search engines can be used to extract web results, news, and other documents of interest for search queries. When search portals want to present these results in a meaningful manner, the portals are usually unaware of the relative importance of these documents for their user context. The available documents, news articles, and other documents are ranked but do not necessarily take into account the dominant topical context. This has the unintended effect of lessening the importance of key result items that are relevant to the context of the user.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to providing improved relevance for search results. When a search query is received, the query context of the search query is analyzed to identify one or more dominant concepts for the search query. The dominant concepts are then expanded using a concept graph from a metabase to identify a number of expanded concepts. Search results for the search query are analyzed to identify the extent to which each search result includes the expanded concepts. The search results are re-ranked based on a strength of relationship of each search result to the expanded concepts and the strength of relationship of each expanded concept to the dominant concepts for the query context.

BRIEF DESCRIPTION OF THE DRAWINGS

The present invention is described in detail below with reference to the attached drawing figures, wherein:

FIG. 3 is a flow diagram showing a method for identifying dominant concepts for a query context and expanding the concepts using a metabase in accordance with an embodiment of the present invention;

FIG. 4 is a flow diagram showing a method for employing a metabase to identify expanded concepts for a search query in accordance with an embodiment of the present invention;

FIG. 5 is a flow diagram showing a method for using expanded concepts to rank search results in accordance with an embodiment of the present invention; and FIG. 6 is a flow diagram showing a method for analyzing and ranking search results using expanded concepts in accordance with an embodiment of the present invention.

DETAILED DESCRIPTION

Figure 1:
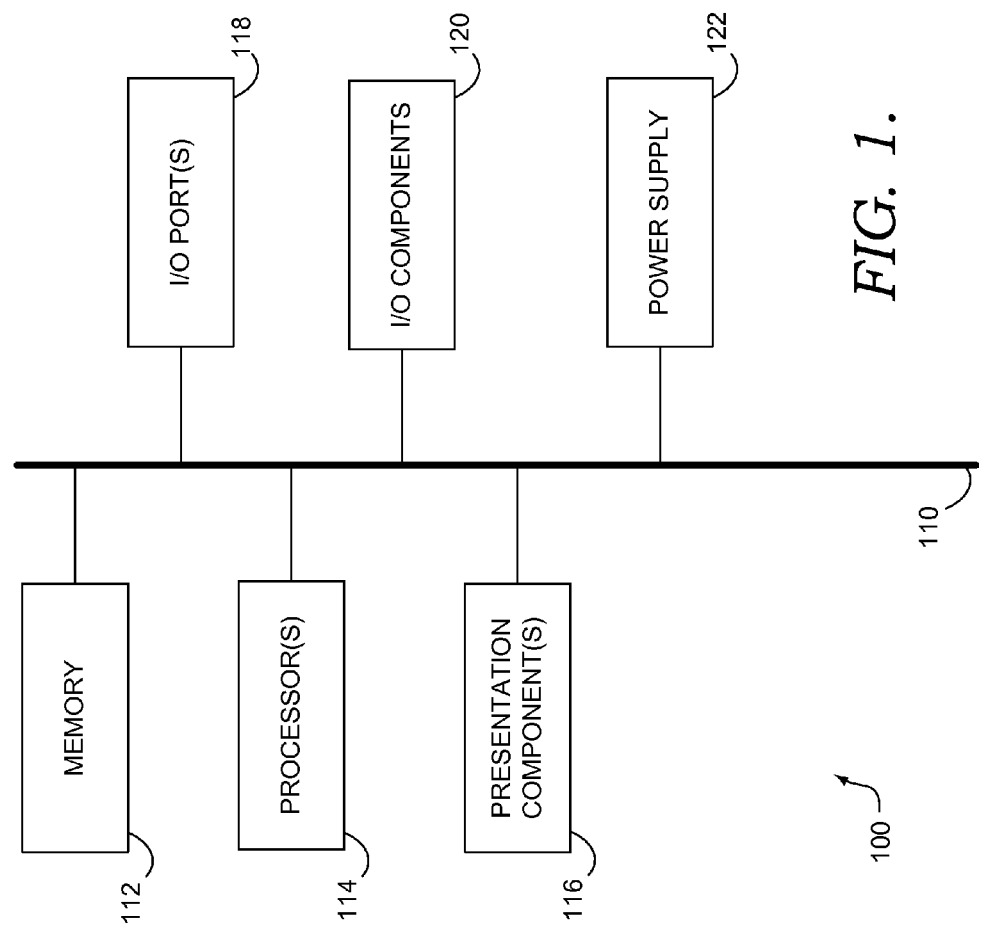
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As previously indicated, embodiments of the present invention are generally directed to improving the relevance of search results for the context of the search query by processing the search query and results for relevant concepts. In accordance with embodiments of the present invention, a search query may be analyzed to identify the query context. Dominant concepts within the query context may also be identified. The dominant concepts may be expanded using a concept graph from a metabase to identify expanded concepts. The concept graph represents concepts as nodes and relationship between concepts as edges between the nodes. The concept graph may be built by analyzing a corpus of electronic documents to extract the concepts and relationships. The concepts in the concept graph include lexical concepts with associated surface forms or strings and ontological concepts with associated semantic relations to other concepts in the graph. Additionally, the concept graph may include data representing the strength of relationship between each concept.

The expanded concepts may be identified from the concept graph by determining the location of the dominant concepts within the concept graph and identifying concepts having a relationship with the dominant concepts. The expanded concepts may be selected based on each concept's strength of relationship with the dominant concepts as determined from the concept graph.

The expanded concepts may be used to analyze and re-rank a set of search results for the search query. In particular, each search result may be analyzed to determine whether the search result contains each expanded concept. A strength of relationship may be determined between each search result and each expanded concept. The search results may then be re-ranked based on the strength of relationship of each search result to each expanded concept as well as the strength of relationship of each expanded concept to the dominant concepts for the search query.

Accordingly, in one aspect, an embodiment of the present invention is directed to a computer-implemented method to re-rank a plurality of search results. The method includes receiving a search query and identifying one or more dominant concepts from the search query. The method also includes expanding the one or more dominant concepts with a plurality of expanded concepts having a relationship with the one or more dominant concepts in a metabase. The method further includes receiving a plurality of ranked search results, analyzing the search results using the expanded concepts, and re-ranking the search results based on the expanded concepts. The method still further includes providing the re-ranked search results for presentation to an end user.

In another embodiment, an aspect of the invention is directed to one or more computer-readable media storing computer-useable instructions that, when used by one or more computing devices, cause the one or more computing devices to perform a method. The method includes receiving a search query and identifying a query context for the search query. The method also includes analyzing the query context to identify one or more dominant concepts. The method further includes identifying a location of each of the one or more dominant concepts within a concept graph and identifying a plurality of additional concepts having a relationship with the one or more dominant concepts within the concept graph. The method also includes assigning a first weight to each additional concept representing a strength of relationship of each additional concept to the one or more dominant concepts within the concept graph. The method further includes selecting a subset of the additional concepts based on the assigned weights to provide a set of expanded concepts. The method also includes receiving a plurality of search results and analyzing each search result to determine whether each search result includes one or more of the expanded concepts. The method further includes assigning one or more second weights to each search result representing a strength of relationship of each search result to the expanded concepts. The method still further includes ranking the search results based on a combination of the first weights and second weights and providing the ranked search results for presentation to an end user.

A further embodiment of the present invention is directed to a system including one or more processors and one or more computer-readable media storing computer-useable components. The computer-useable components include a query context analysis component, a query expansion component, a search result analysis component, and a search result ranking component. The query context analysis component analyzes a query context of a received search query to identify one or more dominant concepts for the search query. The query expansion component expands the one or more dominant concepts to a plurality of expanded concepts using a concept graph from a metabase. The search result analysis component analyzes a plurality of search results to determine a strength of relationship of each search result to the expanded concepts. The search result ranking component ranks the plurality of search results based on the strength of relationship of each search result to the expanded concepts and a strength of relationship of each expanded concept to the one or more dominant concepts.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to an end user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
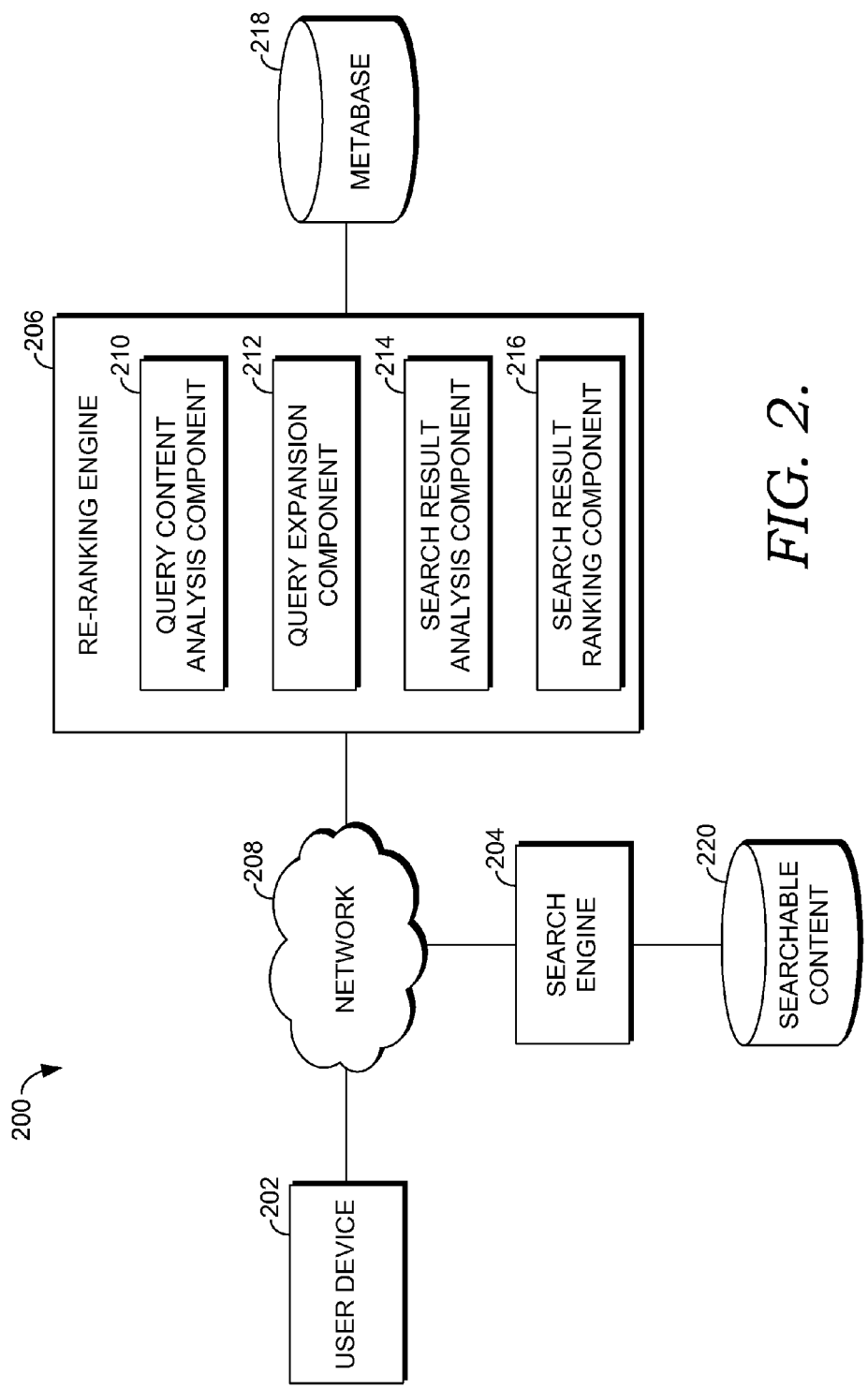
FIG. 2 is a block diagram of an exemplary system in which embodiments of the invention may be employed.

Referring now to FIG. 2, a block diagram is provided illustrating an exemplary system 200 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software.

For instance, various functions may be carried out by a processor executing instructions stored in memory.

Among other components not shown, the system 200 includes a user device 202, search engine 204, and re-ranking engine 206. Each of the components shown in FIG. 2 may be embodied by any type of computing device, such as computing device 100 described with reference to FIG. 1, for example. The components may communicate with each other via a network 208, which may include, without limitation, one or more local area networks (LANs) and/or wide area networks (WANs). Such networking environments are commonplace in offices, enterprise-wide computer networks, intranets, and the Internet. It should be understood that any number of user devices, re-ranking engines, and search engines may be employed within the system 200 within the scope of the present invention. Each may comprise a single device or multiple devices cooperating in a distributed environment. For instance, the re-ranking engine 206 may comprise multiple devices arranged in a distributed environment that collectively provide the functionality of the re-ranking engine 206 described herein. Additionally, other components not shown may also be included within the system 200 and components shown in FIG. 2 may be excluded in some embodiments.

In accordance with embodiments of the present invention, the re-ranking engine 206 generally operates to identify dominant concepts of a search query, expand the dominant concepts using a metabase 218, and re-rank search results based on strength of relationship to the expanded concepts. As shown in FIG. 2, the re-ranking engine 206 generally includes a query context analysis component 210, a query expansion component 212, a search result analysis component 214, and a search result ranking component 216.

In operation, the re-ranking engine 206 may receive a search query. In some embodiments, the search query may be submitted by an end user employing a user device, such as user device 202. For instance, the end user may employ a web browser on the user device 202 to access a search input web page and enter a search query. As another example, the user may enter a search query via a search input box provided by a search engine toolbar located, for instance, within a web browser, the desktop of the user device 202, or other location. One skilled in the art will recognize that a variety of other approaches may also be employed for providing a search query within the scope of embodiments of the present invention. In other embodiments, an API may be provided that allows applications to submit search queries that are received by the re-ranking engine 206. For instance, an application may reside on the user device 202 or other third-party device that submits search queries to the re-ranking engine 206.

When the re-ranking engine 206 receives a search query, the query context analysis component 210 analyzes the search query to identify a query context. The query context may comprise a variety of information regarding the search query. For instance, the search query may include search terms entered by the end user and the query context includes those search terms. In other instances, the search query may comprise a null query, in which an end user has not provided search terms. The query context may also include other information, such as, for instance, the time the search query was submitted or the location of an end user who submitted the search query. A variety of additional information regarding a search query may be identified by the query context analysis component 210 as part of the query context in various embodiments of the present invention.

The query context analysis component 210 also identifies one or more dominant concepts for the search query based on the query context. Each dominant concept may be a particular topic or entity, such as a person, place, or thing, to which the search query pertains. The dominant concepts are not merely terms from the search query but instead represent the main focus of the search query as determined by analysis of the query context. In some embodiments, the dominant concepts may be identified by analyzing the query context in conjunction with concepts from metabase 218. In particular, the metabase 218 may include, among other things, a concept graph. The concept graph may store data regarding concepts and relationships among the concepts. Concepts may be represented by nodes within the concept graph and edges between the nodes may represent relationships among the concepts. Additionally, the edges may identify the strength of relationship between concepts. The data stored by the metabase 218, including the concept graph, may be built by analyzing a corpus of electronic documents, such as documents available on the World Wide Web, to identify concepts and relationships among the concepts within the documents. The data may be dynamic based on changes to documents and the addition of new documents. For instance, the concept graph may be updated based on concepts gleaned from news articles as the articles are published. As such, the concept graph and metabase are not domain constrained.

The query expansion component 212 operates by expanding the dominant concepts for the search query with a collection of expanded concepts from the metabase 218. In accordance with some embodiments of the present invention, this may include identifying the location of each dominant concept in the concept graph of the metabase 218. Other concepts that have a relationship with the dominant concepts within the concept graph are identified. Additionally, the strength of the relationship of the concepts to the dominant concepts is determined from the concept graph. In embodiments, a weight, ranking, or other score may be determined for each concept that represents the strength of relationship of the concept to the dominant concepts. The concept weights, rankings, or scores may be used to determine which concepts to select as expanded concepts for further analysis. For instance, in some embodiments, the top N concepts may be selected as expanded concepts. In other embodiments, concepts having a weight, ranking, or other score exceeding a predetermined threshold may be selected as expanded concepts.

The expanded concepts are employed to re-rank a set of search results. The search results to be re-ranked may be provided to the re-ranking engine 206 in a number of different manners in various embodiments of the present invention. In some embodiments, the search engine 204 provides a set of ranked search results. The search results may be selected and ranked using the initial search query and based on the search engine's 204 underlying search algorithms over searchable content 220, which may include a search system index. In some cases, the search results may also be initially selected based in part on the dominant concepts and/or expanded concepts identified for the query context.

The searchable content 220 may include a number of different sources, such as general web documents, news documents, photos, TWITTER feeds, etc. As such, in some embodiments, the received search results may include separate sets of search results corresponding with the different sources. For instance, the received search results may include a set of general web documents, a group of news documents, a group of photos, a group of TWITTER feeds, etc.

The search engine 204 and the re-ranking engine 206 may both be provided by a single search system provider such that the search engine 204 and re-ranking engine 206 operate collectively to receive a search query from an end user and return search results re-ranked in accordance with embodiments. In other embodiments, the search engine 204 may be provided by a search system provider separate from a provider of the re-ranking engine 206. As such, the re-ranking engine may receive as input from the search engine 204, the initial search query and a set of search results for re-ranking. In still further embodiments, other components not shown in FIG. 2 may provide a search query and set of search results to the re-ranking engine 206 for re-ranking the search results.

The search result analysis component 214 analyzes the set of search results using the expanded concepts. In accordance with some embodiments, the search result analysis component 214 analyzes each search result to identify whether the search result contains the expanded concepts. The analysis may be performed on a search result title, a search result snippet, a document referenced by the search result, or other text or metadata associated with the search result. A weight, ranking, or other score may be assigned for each search result and each expanded concept that represents that strength of relationship of the expanded concept to the search result.

The search result ranking component 216 uses the search result/expanded concept weights, rankings, or scores in conjunction with the weights, rankings, or scores for expanded concepts/dominant concept pairs to rank the search results. In particular, the search result/expanded concept pair weights, rankings, or scores represent the strength of relationship of each search result to the expanded concepts and the expanded concept/dominant concept weights, rankings, or scores represent the strength of relationship of each expanded concept to the dominant concepts. In some embodiments, the search results may include an initial ranking when received which may or may not be used by the search result ranking component 216 to determine the search result rankings. The search results may be provided to an end user and presented in accordance with the rankings determined by the search result ranking component 216.

Turning to FIG. 3, a flow diagram is provided that illustrates a method 300 for employing a metabase to identify expanded concepts for a search query in accordance with an embodiment of the present invention. Initially, as shown at block 302, a search query is received. In some embodiments, the search query may be submitted by an end user. For instance, the end user may employ a web browser to access a search input web page and enter a search query. As another example, the end user may enter a search query via a search input box provided by a search engine toolbar located, for instance, within a web browser, the desktop of the end user's device, or other location. One skilled in the art will recognize that a variety of other approaches may also be employed by an end user to provide a search query. In still further embodiments, an API may provided that allows any application to query the system to receive a list of search results re-ranked using embodiments of the present invention.

After receiving a search query, a query context for the search query is analyzed, as shown at block 304. In particular, the query context comprises information regarding the search query. In some instances, the search query includes search terms entered by the end user and the query context includes those search terms. In other instances, the search query may comprise a null query, in which an end user has not provided search terms. The query context may also include other information, such as, for instance, the time the search query was submitted or the location of an end user who submitted the search query. A variety of additional information regarding a search query may be identified as part of the query context in various embodiments of the present invention.

One or more dominant concepts are identified from the query context, as shown at block 306. Each dominant concept may be a particular topic or entity, such as a person, place, or thing, to which the search query pertains. The dominant concepts are not merely terms from the search query but instead represent the main focus of the search query as determined by analysis of the query context.

In some embodiments, the dominant concepts may be identified by analyzing the query context in association with a concept graph from the metabase. As noted above, the concept graph may include a collection of concepts and relationships among the concepts. Concepts are represented as nodes within the concept graph and relationships among the concepts are represented as edges between the nodes. Using the query context, concepts from the concept graph may be identified as the dominant concepts for the search query.

In further embodiments, dominant concepts may be predefined for certain types of searches. For instance, a finance portal or finance search vertical may automatically provide a number of search results such as finance-related news when an end user first visits the portal or search vertical without the end user submitting a search query. The search query used by the finance portal or search vertical to access such search results may be considered a null query since the end user has not provided any search terms. In such instances, the query context may identify the search query as being generated by the finance portal or finance search vertical and may identify one or more default dominant concepts relating to finance.

As shown at block 308, the dominant concepts identified for the query context are expanded with additional concepts from the metabase. A number of approaches may be employed for expanding the dominant concepts with additional concepts from the metabase. One exemplary method 400 for using the metabase to expand the dominant concepts is illustrated in FIG. 4. As shown in block 402, the process includes identifying the dominant concepts within the concept graph. Additionally, as shown at block 404, other concepts having a relationship with the dominant concepts are identified within the concept graph. A weight or other type of score is assigned to each of the additional concepts based on the strength of relationships to each of the dominant concepts within the concept graph, as shown at block 406.

A group of expanded concepts are selected at block 408 based on the weights assigned to each concept. In some embodiments, a predetermined number of expanded concepts having the greatest weights (i.e., representing the strongest relationships to the dominant concepts) are selected. For instance, the top N concepts may be selected at block 408. In other embodiments, all concepts having a weight that exceeds a predetermined threshold are selected at block 408. For instance, a threshold that represents a sufficient strength of relationship to the dominant concepts may be predefined by the system provider. Any concepts whose weight exceeds that threshold would be considered useful for further evaluation. In contrast, concepts that do not have a sufficient relationship to the dominant concepts (as evidenced by not exceeding the threshold) would be excluded. Any and all such variations for determining which concepts to select from the concept graph are contemplated to be within the scope of embodiments of the present invention.

Referring next to FIG. 5, a flow diagram is provided illustrating a method 500 for using expanded concepts to re-rank search results in accordance with an embodiment of the present invention. As shown at block 502, a set of search results for a given search query are received. The search results may be obtained from a single source or from multiple sources. For instance, the search results may include general web search results, news results, image results, video results, TWITTER search results, to name a few.

In some embodiments, the set of search results may be obtained by performing a search using the initial search query. A search engine's native search techniques and algorithms may be employed to perform the search to select and rank the set of search results. In some embodiments, the dominant and/or expanded concepts identified for the search query may be employed in selecting the initial set of search results. In further embodiments, the set of ranked search results may be provided as part of the search query. For instance, an API may be provided that allows applications to query the system by providing a set of search results to be re-ranked using embodiments of the invention.

As shown at block 504, the search results are analyzed using expanded concepts identified for the search query. The expanded concepts may have been identified using a method such as that described hereinabove with reference to FIG. 3. The search results are ranked at block 506 based on the expanded concepts. Search results may be analyzed and ranked using a number of different approaches in accordance with various embodiments of the present invention.

One exemplary method 600 for using expanded concepts to analyze and re-rank search results is illustrated in FIG. 6. As shown at block 602, each search result is analyzed to identify whether the expanded concepts appear in each search result. This may include analyzing a search result title, a search result snippet, and/or parts of a document to which the search result references. Based on this analysis, a weight or other score is assigned to each search result for each expanded concept, as shown at block 604. The weight for a given search result and expanded concept represents a strength of relationship of the search result to the expanded concept. The weight may be derived, for instance, by determining the number of times the expanded concept appears within the search result. As another example, the weight may be derived by identifying concepts in the search result and using the concept graph from the metabase to determine the strength of relationship of those concepts to the expanded concept. A number of additional approaches may be employed for assigning a weight for a given search result and expanded concept pair.

As a result of the analysis at block 604, a search result will have an associated weight for each of the expanded concepts. These weights are aggregated for each search result and used to rank the search results, as shown at block 606. In embodiments, the search result/expanded concept weights are used in conjunction with weights assigned to each expanded concept representing the strength of relationship of each expanded concept to the dominant concepts from the query context (as described hereinabove).

In some embodiments, the search results have an initial ranking. For instance, the search results may be obtained by performing a general web search using the search query, which provides a ranking for search results. The initial ranking may be either discarded or may be used in conjunction with ranking based on search result/expanded concept weights and expanded concept/dominant concept weights in various embodiments of the present invention.

As an alternative to using weights, rankings or other scores may be employed in some embodiments. For instance, the search results may be ranked for each expanded concept such that the search results are ordered based on strength of relationship of the search results to each expanded concept. Each expanded concept may also be ranked for the dominant concepts from the query context such that the expanded concepts are ordered based on strength of relationship to the dominant concepts. The rankings may be aggregated to determine the overall ranking for the search results.

Returning to FIG. 5, after ranking the search results based on the strength of relationship of the search results to expanded concepts and the strength of relationship of the expanded concepts to dominant concepts from the query context, the search results are provided for presentation to an end user, as shown at block 508. The search results are presented in accordance with the rankings determined at block 506. For instance, the search results may be presented in a list ordered based on the rankings. In some embodiments, one or more highest ranked search results may be presented in a prominent position, while other search results are placed in a less prominent position. For instance, higher ranked search results may be presented on a search results page, while the lower ranked search results are provided in various tabs and are not presented until such tabs are selected by an end user. In embodiments in which the search results are obtained from multiple sources, the search results may be provided in separate groupings. For instance, general web search results may be provided in one grouping, news search results may be provided in another grouping, etc.

As can be understood, embodiments of the present invention are directed to improving the relevance of search results by processing dominant concepts from a query context to identify expanded concepts from a concept graph and re-ranking search result using the expanded concepts.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method to provide a plurality of search results, the method comprising:
   receiving a search query;
   identifying one or more dominant concepts from the search query;
   expanding the one or more dominant concepts with a plurality of expanded concepts having a relationship with the one or more dominant concepts in a metabase;
   receiving a plurality of search results based on the search query;
   analyzing the search results using the expanded concepts, wherein analyzing the search results using the expanded concepts comprises identifying a strength of relationship of at least one search result to at least one expanded concept;
   varying a prominence of the search results such that one or more higher ranked search results are included within a listing on a search results page and one or more lower ranked search results are included in one or more tabs on the search results page, wherein varying the prominence of the search results comprises providing the lower ranked search results within the one or more tabs based on the strength of relationship of the one or more lower ranked search results to the at least one expanded concept and a strength of relationship of the at least one expanded concept to the one or more dominant concepts, wherein the one or more lower ranked search results are associated with a first ranking lower than a second ranking associated with the one or more higher ranked search results; and providing the one or more higher ranked search results listed on the search results page and the one or more lower ranked search results within the one or more tabs on the search results page.

2. The computer-implemented method of claim 1, wherein the search query is received in response to an end user submitting the search query.

3. The computer-implemented method of claim 1, wherein the search query comprises one or more search terms and the one or more dominant concepts are identified based at least in part on the one or more search terms.

4. The computer-implemented method of claim 3, wherein the one or more dominant concepts are identified by analyzing the one or more search terms using the metabase.

5. The computer-implemented method of claim 3, wherein the one or more dominant concepts are identified using query context information in addition to the one or more search terms.

6. The computer-implemented method of claim 1, wherein the metabase is built by identifying concepts and relationships among concepts within electronic documents available on the world wide web and the metabase is dynamically updated as new content is published on the world wide web.

7. The computer-implemented method of claim 1, wherein the search results are provided in conjunction with the search query.

8. The computer-implemented method of claim 1, wherein the search results comprises multiple separate sets of search results from a plurality of sources.

9. The computer-implemented method of claim 8, wherein the plurality of sources comprises one or more selected from the following: general web search results, news, and photos.

10. The computer-implemented method of claim 1, further comprising establishing a strength threshold for the plurality of expanded concepts having a relationship with the one or more dominant concepts and selecting expanded concepts that are above the established strength threshold.

11. One or more computer-readable media not a signal per se storing computer-useable instructions that, when used by one or more computing devices, cause the one or more computing devices to perform a method comprising:
    receiving a search query;
    identifying a query context for the search query;
    analyzing the query context to identify one or more dominant concepts;
    identifying a location of each of the one or more dominant concepts within a concept graph;
    identifying a plurality of additional concepts having a relationship with the one or more dominant concepts within the concept graph;
    assigning a first weight to each additional concept representing a strength of relationship of each additional concept to the one or more dominant concepts within the concept graph;
    selecting a subset of the additional concepts based on the assigned weights to provide a set of expanded concepts;
    receiving a plurality of search results for the search query;
    analyzing each search result to determine whether each search result includes one or more of the expanded concepts;
    assigning one or more second weights to each search result representing a strength of relationship of each search result to the expanded concepts;
    varying a prominence of the search results such that one or more higher ranked search results are included in a listing on a search results page and one or more lower ranked search results are represented by one or more tabs on the search results page based on a combination of the first weights and second weights; and
    providing the one or more tabs for presentation in the search results page with the listing of the one or more higher ranked search results in the search results page.

12. The one or more computer-readable media of claim 11, wherein the search query includes one or more search terms and the query context includes the one or more search terms.

13. The one or more computer-readable media of claim 12, wherein the query context includes information in addition to the one or more search terms.

14. The one or more computer-readable media of claim 11, wherein the search query comprises a null query.

15. The one or more computer-readable media of claim 11, wherein the one or more dominant concepts are identified by analyzing the query context using the concept graph.

16. The one or more computer-readable media of claim 11, wherein the concept graph is built by identifying concepts and relationships among concepts within electronic documents available on the world wide web
    and the concept graph is dynamically updated as new content is published on the world wide web.

17. The one or more computer-readable media of claim 11, wherein the plurality of search results are provided in conjunction with the search query.

18. The one or more computer-readable media of claim 11, wherein the plurality of search results comprises multiple separate sets of search results from a plurality of sources.

19. The one or more computer-readable media of claim 18, wherein the plurality of sources comprises one or more selected from the following: general web search results, news, and photos.

20. A system including one or more processors and one or more computer-readable media storing computer-useable components, the computer-useable components comprising:
    a query context analysis component that analyzes a query context of a received search query to identify one or more dominant concepts for the search query;
    a query expansion component that expands the one or more dominant concepts to a plurality of expanded concepts using a concept graph from a metabase;
    a search result analysis component that analyzes a plurality of search results to determine a strength of relationship of each search result to the expanded concepts; and
    a search result presentation component that varies a prominence of the plurality of search results based on the strength of relationship of each search result to the expanded concepts and a strength of relationship of each expanded concept to the one or more dominant concepts such that a first search result associated with a first strength is displayed in a search results list within a search results page and a second search result associated with a second strength, lower than the first strength, is represented by one or more tabs on the search results page, wherein the second search result is only presented upon selection of the one or more tabs.

* * * * *